Feb. 9, 1932. W. R. UGGLA 1,844,193
ELECTRIC MACHINE
Filed Aug. 24, 1927
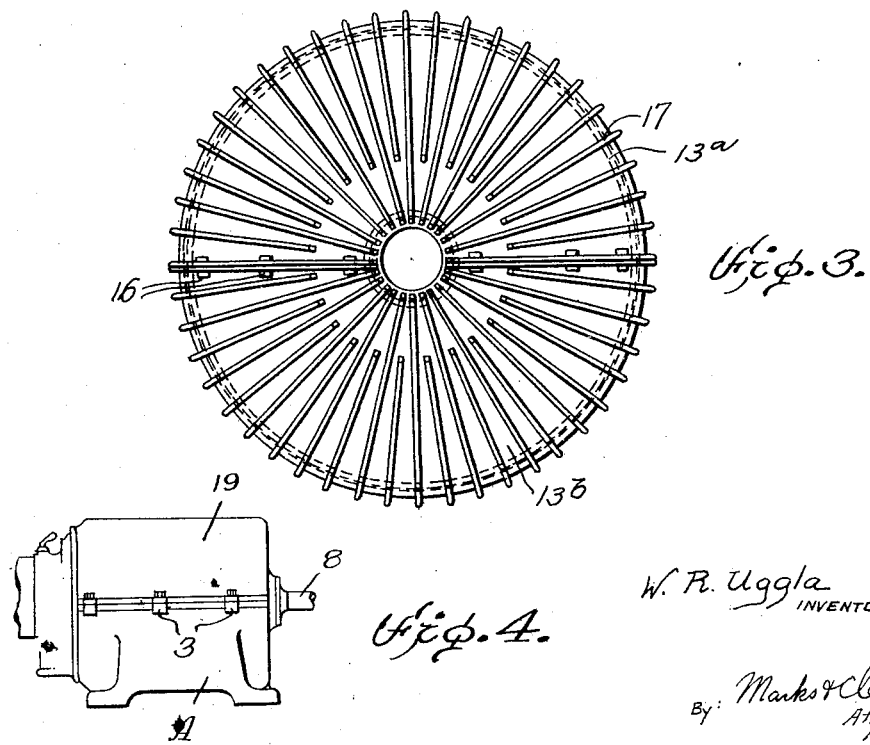

Patented Feb. 9, 1932

1,844,193

UNITED STATES PATENT OFFICE

WILHELM ROBERT UGGLA, OF MORBY, STOCKSUND, SWEDEN, ASSIGNOR TO LUTH & ROSENS ELEKTRISKA AKTIEBOLAG, OF STOCKHOLM, SWEDEN, A CORPORATION OF SWEDEN

ELECTRIC MACHINE

Application filed August 24, 1927, Serial No. 215,144, and in Sweden December 7, 1926.

The present invention relates to dynamo electric machines, the term dynamo electric machines being intended as generic to electric motors, generators, rotary converters and the like. More specifically, the invention relates to dynamo electric machines of generally standard form, provided with cooling means for dissipating the heat generated in the normal operation of the machines by axial flow of air thereover. Still more specifically, the invention relates to dynamo electric machines having longitudinally divided casings providing covers which are removable for inspection, repair and replacement or alteration of parts without removing the major electrical elements from the base member of the casing.

Machines of this character, sold as standard units, are used under widely varying circumstances and in some instances it is necessary, because of atmospheric conditions where the machines are used, to fully enclose the rotor and stator in order to protect the windings thereof from dust, acid fumes or other factors causing deterioration. In localities where the electrical elements do not require complete enclosure, they may be most readily and efficiently cooled by air directed axially through the machine in direct contact with the elements requiring cooling. Under circumstances requiring that the elements be fully enclosed, the necessary cooling must be effected by heat of convection and conduction through the enclosing elements, and it is difficult as well as highly important to provide enclosing elements capable of transmitting sufficient heat from the enclosed space around the heat generating elements to the cooling air to prevent overheating of the machines.

One of the principal objects of the present invention is to provide a novel form of dynamo electric machine which may be readily converted from one utilizing direct cooling of the heat generating elements to one of the fully enclosed type in which cooling is indirectly accomplished, and vice versa. Another object is to provide a convertible machine of the character set forth in which the indirect cooling is substantially as effective as the direct cooling.

Further and more detailed objects of the invention, together with the advantages to be derived from its use, may best be understood from the following description of a preferred form of apparatus embodying the invention and illustrated in the accompanying drawings forming part of this specification.

In the drawings, Fig. 1 is a plan view partly in section of one-half of a dynamo electric machine embodying the invention, the casing cover being removed;

Fig. 2 is a side elevation of the lower half of the machine shown in Fig. 1;

Fig. 3 is an end elevation of one of the end plates employed in the machine; and Fig. 4 is a side elevation on a smaller scale showing the complete machine with the casing cover in place.

The dynamo electric machine illustrated is of the type above referred to, which is provided with means for effecting axial ventilation.

The machine comprises an outer casing A longitudinally divided to form a base member 1 flanged as at 2 for the reception of a cover 19 (Fig. 4) forming the upper part of the casing, the cover being preferably bolted to the base member 1 by bolts passing through the drilled bosses 3.

The stator 4 comprising a shell 5 is mounted within the base member 1 and spaced therefrom to provide an axial space 6 for flow of air between the shell and the casing. A rotor 7, within the stator 4, is carried by a shaft 8 journalled in bearings 9 mounted in casing A.

A fan 10 mounted on shaft 8 is adapted to draw air through the opening 11 in the casing axially through the casing and to discharge it by way of the opening 12.

Removable end plates 13 are provided, these plates being divided into parts, preferably upper and lower halves 13a and 13b, as shown in Fig. 3. As will be seen from Fig. 1, the cover plates 13 are cup-shaped and as may be seen from the figure are symmetrical so that they may be turned within the casing. From this it will be seen that the cover plates 13 may be inserted and removed from the casing upon the removal of the cover by turning the lower halves of the plates 13b into position and then placing the upper halves of the plates in position. The cover plates are preferably secured directly to the shell 5 by means of screws 14 and bear against the shaft 8 at 15.

After the parts of the end plates have been inserted, they are secured together preferably by means of bolts or studs 16, and when they are inserted in a machine after the assembly of the machine and without the removal of the stator from the machine, the screws 14 in the upper half of the machine serve to hold the entire end plate assemblies, which are rigid units, in position.

In order to effect the necessary cooling, when indirect cooling is employed, the end plates must be provided with means forming extended heat absorbing and heat dissipating surfaces. The general flow of air at the ends of the machine, as will be seen from Fig. 1, is radial, while intermediate the ends of the machine the air flow induced by the fan is axial. I therefore provide the end covers with heat dissipating flanges 17, radially arranged at the ends of the covers and extending axially along the cylindrical portions thereof. By arranging the flanges in this manner, an even and uniform air flow providing the maximum cooling is obtained. The end plates are further provided with inwardly extending projections 18 for increasing the heat absorbing surface of the plates. These projections may be in the form of studs or flanges, and are arranged to permit rotary flow of air therebetween, since movement of the rotor causes rotary air movement within the closed chamber formed by the stator and the end plates. By thus providing extended surface both on the inner and outer surfaces of the end plates, sufficient heat transfer is obtained from the air in the enclosed space and to the cooling air outside the plates, to render the plates effective. The extended surface is necessary to achieve the desired result, since the controlling factor in the rate of heat transfer is the rate at which heat is absorbed and dissipated by the plates.

Through the provision of the end-covers 13, standard machines adapted to be cooled by direct axial air flow therethrough may easily be changed to machines cooled through the stator shell and the end plates. In the machines thus altered the windings and other parts are protected against the atmospheric air, dust and the like.

I claim:

1. A dynamo electric machine comprising a casing longitudinally divided into a base member and a cover, a stator comprising a shell mounted in said base member and spaced therefrom to provide space for flow of air between said shell and said casing, a rotor having a shaft journalled in the casing, removable end plates forming end closures for said stator and said rotor, said end plates being divided to permit their insertion and removal from the casing upon removal of the casing cover and means for causing flow of air over said plates and through said space.

2. A dynamo electric machine comprising a casing longitudinally divided into a base member and a cover, a stator comprising a shell mounted in said base member and spaced therefrom to provide space for flow of air between said shell and said casing, a rotor having a shaft journalled in the casing, removable end plates secured to said shell and bearing on said shaft for forming end closures for said stator and said rotor, each of said end plates being divided into parts adapted to be inserted and removed upon removal of the casing cover and means for causing flow of air over said plates and through said space.

3. A dynamo electric machine comprising a casing longitudinally divided into a base member and a cover, a stator comprising a shell mounted in said base member and spaced therefrom to provide space for flow of air between said shell and said casing, a rotor having a shaft journalled in the casing, removable end plates secured to said shell and bearing on said shaft for forming end closures for said stator and said rotor, each of said end plates comprising symmetrical parts having extended heat transfer surface and adapted to be inserted and removed from the casing upon removal of the casing cover and means for causing flow of air over said plates and through said space.

In testimony whereof I have hereunto affixed my signature.

WILHELM ROBERT UGGLA.